United States Patent [19]

Mark

[11] Patent Number: 4,504,649

[45] Date of Patent: Mar. 12, 1985

[54] COPOLYESTER-CARBONATE RESINS

[75] Inventor: Victor Mark, Evansville, Ind.

[73] Assignee: General Electric Company, Mt. Vernon, Ind.

[21] Appl. No.: 562,273

[22] Filed: Dec. 16, 1983

[51] Int. Cl.³ ............................................. G08G 63/64
[52] U.S. Cl. .................................. 528/176; 528/125; 528/126; 528/128; 528/173; 528/191; 528/193; 528/194
[58] Field of Search ............... 528/191, 193, 176, 125, 528/126, 128, 173, 194

[56] References Cited

U.S. PATENT DOCUMENTS

| | | | |
|---|---|---|---|
| 3,030,335 | 4/1965 | Goldberg | 525/439 |
| 3,207,814 | 9/1965 | Goldberg | 528/196 |
| 3,493,534 | 2/1970 | Coury | 528/196 |
| 4,107,143 | 8/1978 | Inata et al. | 528/193 |
| 4,381,358 | 4/1983 | Rosenquist | 528/193 |

*Primary Examiner*—Lester L. Lee
*Attorney, Agent, or Firm*—Myron B. Kapustij; Martin B. Barancik

[57] ABSTRACT

Copolyester-carbonate resins exhibiting improved processability which are derived from:
(i) at least one diester-diol which is the coreaction product of an aromatic hydroxy carboxylic acid or an ester forming reactive derivative thereof and a diol;
(ii) at least one dihydric phenol;
(iii) at least one bishaloformate; and
(iv) a carbonyl halide carbonate precursor.

32 Claims, No Drawings

COPOLYESTER-CARBONATE RESINS

BACKGROUND OF THE INVENTION

Copolyester-carbonate resins are members of the tough thermoplastic family of resins which, due to their many advantageous mechanical and physical properties, are finding increasing use as thermoplastic engineering materials. These copolyester-carbonate resins exhibit, for example, excellent properties of toughness, flexibility, impact strength, optical clarity, and high heat distortion temperatures. The conventional copolyester-carbonates may be produced by the coreaction of a dihydric phenol, a dicarboxylic acid or an ester forming reactive derivative thereof, and a carbonate precursor. These conventional copolyester-carbonates as well as methods for their preparation are disclosed inter alia in U.S. Pat. No. 3,169,121.

Unfortunately, these conventional copolyester-carbonates are rather difficult to process. It would, therefore, be highly desirable to provide copolyester-carbonat resins which are generally similar in many respects to conventional copolyester-carbonates and also exhibit improved processability.

It is, therefore, an object of the instant invention to provide copolyester-carbonate resins exhibiting improved processability.

SUMMARY OF THE INVENTION

The instant invention is directed to copolyester-carbonate resins derived from (i) a diester diol which is the coreaction product of (a) at least one aromatic hydroxy carboxylic acid or an ester forming reactive derivative thereof, and (b) at least one aliphatic or aromatic diol; (ii) at least one bishaloformate; (iii) at least one dihydric phenol; and (iv) a carbonyl halide carbonate precursor.

While the instant copolyester-carbonate resins generally exhibit, to a substantial degree, generally similar physical and mechanical properties as conventional copolyester-carbonate resins they also exhibit improved processability as characterized by improved flow rates. The copolyester-carbonate resins of the instant invention are useful for making tough transparent films and molded articles.

DESCRIPTION OF THE INVENTION

The instant invention is directed to copolyester-carbonate resins generally exhibiting, to a substantial degree, substantially most of the advantageous physical and mechanical properties of conventional copolyester-carbonates such as toughness, flexibility, impact strength, optical clarity, and good heat distortion temperatures, and also exhibit improved processability.

Briefly stated, the copolyester-carbonate resins of the instant invention are comprised of recurring carbonate groups

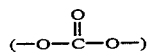

carboxylate groups

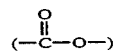

and aromatic carbocyclic groups in the polymer chain in which at least some of the carboxylate groups and at least some of the carbonate groups are bonded directly to the ring carbon atoms of the aromatic carbocyclic groups.

The copolyester-carbonate resins of the instant invention are derived from (i) at least one diester diol which is the coreaction product of (a) at least one aromatic hydroxy carboxylic acid or an ester forming reactive derivative thereof, and (b) at least one aliphatic or aromatic diol; (ii) at least one bishaloformate; (iii) at least one dihydric phenol; and (iv) a carbonyl halide carbonate precursor.

These copolyester-carbonate resins contain the following recurring structural units represented by the general formulae:

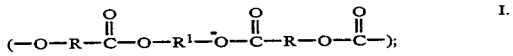

In the above formulae R is independently selected from divalent aromatic radicals; $R^1$ is selected from divalent aromatic radicals, divalent aliphatic radicals, and divalent aliphatic ether residues; $R^2$ is selected from the divalent residues of dihydric phenols; and $R^3$ is selected from divalent aliphatic radicals.

R in Formula I is a divalent aromatic radical represented by the general formula

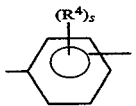

wherein $R^4$ is independently selected from monovalent hydrocarbon radicals and halogen radicals, and s is a positive integer having a value of from 0 to 4 inclusive. The monovalent hydrocarbon radicals represented by $R^4$ are preferably selected from alkyl radicals and cycloalkyl radicals. The preferred alkyl radicals are those containing from 1 to about 10 carbon atoms and include the straight chain and the branched alkyl radicals, e.g., methyl, ethyl, propyl, isopropyl, butyl, tertiarybutyl, pentyl, neopentyl, and hexyl. The preferred cycloalkyl radicals are those containing from 4 to about 7 ring carbon atoms, e.g., cyclobutyl, cyclopentyl, cyclohexyl, methylcyclohexyl, and cycloheptyl. The preferred halogen radicals are chlorine and bromine. When more than one $R^4$ substituent is present they may be the same or different. Preferably R is a phenylene radical.

$R^1$ in Formula I is selected from divalent aliphatic radicals, divalent aromatic radicals, and divalent aliphatic ether residues. The divalent aliphatic radicals represented by $R^1$ are selected from alkylene radicals, alkylidene radicals, cycloalkylene radicals, and cycloalkylidene radicals. Preferably the divalent aliphatic radicals represented by $R^1$ are the alkylene and cycloalkylene radicals. The preferred alkylene radicals are those containing from 2 to about 20 carbon atoms. The preferred cycloalkylene radicals are those containing from 4 to about 7 ring carbon atoms. The divalent aliphatic ether residues may be represented by the general formla

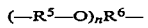

wherein:
R$^5$ is selected from alkylene and cycloalkylene radicals;
R$^6$ is selected from alkylene and cycloalkylene radicals; and
n is a positive integer having a value of from 1 to about 10.

Preferred alkylene radicals represented by R$^5$ and R$^6$ are those containing from 1 to about 20 carbon atoms. Preferred cycloalkylene radicals represented by R$^5$ and R$^6$ are those containing from 4 to about 7 ring carbon atoms.

Some illustrative non-limiting examples of these divalent aliphatic hydrocarbon radicals and divalent aliphatic ether residues include:

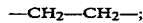

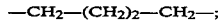

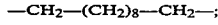

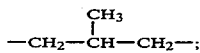

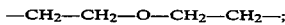

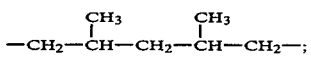

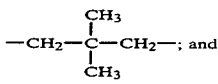

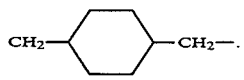

The divalent aromatic radicals represented by R$^1$ may be represented by the general formula

wherein R$^7$ is independently selected from monovalent hydrocarbon radicals and halogen radicals, Ar is a divalent aromatic radical, and q is a positive integer from and including zero up to the number of positions on Ar available for substitution. Preferably Ar is an aromatic radical containing from 6 to 12 carbon atoms. These preferred divalent aromatic radicals include phenylene, naphthylene, and biphenylene. The monovalent hydrocarbon radicals represented by R$^7$ include alkyl radicals, cycloalkyl radicals, aryl radicals, aralkyl radicals, and alkaryl radicals. The preferred alkyl radicals are those containing from 1 to about 10 carbon atoms. The preferred cycloalkyl radicals represented by R$^7$ are those containing from 4 to about 7 ring carbon atoms. The preferred aryl radicals represented by R$^7$ are those containing from 6 to 12 carbon atoms. The preferred aralkyl and alkaryl radicals represented by R$^7$ are those containing from 7 to about 14 carbon atoms.

Ar may also include two phenylene radicals joined together by an intervening alkylene or other bridging group. That is to say, R$^1$ may also be a divalent aromatic radical represented by the general formula

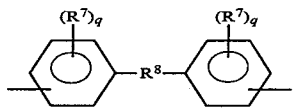

wherein R$^7$ and q are as defined hereinafore; and R$^8$ is an alkylene, alkylidene, cycloalkylene, cycloalkylidene, —O—, —S—, —S—S—,

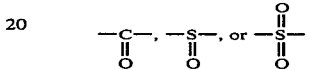

radical. Preferably R$^8$ is an alkylene, cycloalkylene, alkylidene, or cycloalkylidene radical. The preferred alkylene radicals are those containing from 2 to about 10 carbon atoms. The preferred alkylidene radicals are those containing from 1 to about 10 carbon atoms. The preferred cycloalkylene and cycloalkylidene radicals are those containing from 4 to about 7 ring carbon atoms.

Preferably R$^1$ is selected from aliphatic radicals and divalent aliphatic ether residues. The preferred divalent aliphatic radicals are the alkylene radicals.

R$^2$ in Formula III is selected from the residues of dihydric phenols. These residues of dihydric phenols may be represented by the general formula

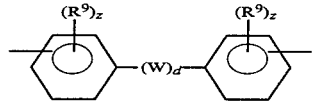

wherein:
W is selected from alkylene, alkylidene, cycloalkylene, cycloalkylidene, —O—, —S—, —S—S—,

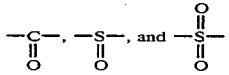

radicals;
R$^9$ is independently selected from monovalent hydrocarbon radicals and halogen radicals;
d is either zero or one; and
z is a positive integer having a value of from 0 to 4 inclusive.

The preferred alkylene radicals represented by W are those containing from 2 to about 10 carbon atoms. The preferred alkylidene radicals are those containing from 1 to about 10 carbon atoms. The preferred cycloalkylene and cycloalkylidene radicals represented by W are those containing from 4 to about 7 ring carbon atoms.

The monovalent hydrocarbon radicals represented by R$^9$ are selected from alkyl radicals, cycloalkyl radicals, aryl radicals, aralkyl radicals, and alkaryl radicals. The preferred alkyl radicals are those containing from 1 to about 10 carbon atoms. Some illustrative non-limiting examples of these alkyl radicals, include methyl, ethyl, propyl, isopropl, butyl, pentyl, neopentyl, and hexyl.

The preferred cycloalkyl radicals represented by $R^9$ are those containing from 4 to about 7 ring carbon atoms.

The preferred aryl radicals represented by $R^9$ are those containing from 6 to 12 carbon atoms. These include phenyl, naphthyl, and biphenyl.

The preferred aralkyl and alkaryl radicals are those containing from 7 to about 14 carbon atoms.

When more than one $R^9$ substituent is present on the ring carbon atoms of the aromatic nuclear residue they may be the same or different. When d is zero the aromatic nuclear residues are directly joined with no intervening alkylene or other bridging group. The preferred halogen radicals represented by $R^9$ are chlorine and bromine.

Preferred residues of dihydric phenols are those wherein d is one and W is selected from alkylene, alkylidene, cycloalkylene, and cycloalkylidene radicals.

$R^3$ in Formula II represents a divalent aliphatic hydrocarbon radical containing from 1 to about 20 carbon atoms. The preferred divalent aliphatic hydrocarbon radicals are the alkylene radicals containing from 1 to about 20 carbon atoms and the cycloalkylene radicals containing from 4 to about 7 ring carbon atoms. The alkylene radicals may be straight chain alkylene radicals or branched alkylene radicals.

$R^3$ may also be a divalent aliphatic hydrocarbon radical represented by the general formula

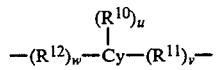

wherein:

$R^{10}$ is independently selected from alkyl radicals containing from 1 to about 10 carbon atoms;

Cy is a cycloalkylene radical containing from 4 to about 7 ring carbon atoms;

$R^{11}$ and $R^{12}$ are independently selected from alkylene radicals, preferably those containing from 1 to about 10 carbon atoms;

u is a positive integer having a value of from zero up to and including the number of replaceable hydrogen atoms present on Cy; and w and v are independently selected from 0 and 1, with the proviso that the sum of w and v is at least one.

The aromatic hydroxy carboxylic acid reactant of which R in Formula I is the residue and which is one of the coreactants used in the preparation of the diester-diol may be represented by the general formula

wherein R is as defined hereinafore. More particularly, the aromatic hydroxy carboxylic acid is a hydroxy benzoic acid represented by the general formula

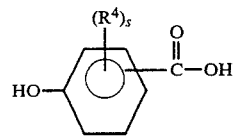

wherein $R^4$ and s are as defined hereinafore.

Some illustrative non-limiting examples of these hydroxy benzoic acids include para-hydroxybenzoic acid, m-hydroxybenzoic acid, 3-hydroxy-5-chlorobenzoic acid, 3-hydroxy-5-methylbenzoic acid, and 3-hydroxy-5-ethylbenzoic acid.

In the preparation of the diester-diol of the instant invention it is possible and sometimes even preferred to utilize the ester forming reactive derivatives of these aromatic hydroxy carboxylic acids, and more particularly the ester forming reactive derivatives of the hydroxy benozic acid, rather than using the acids themselves.

These ester forming reactive derivatives of the aromatic hydroxy carboxylic acids may be represented by the general formula

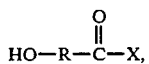

and more particularly the ester forming reactive derivatives of the hydroxy benzoic acids may be represented by the general formula

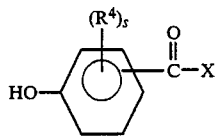

wherein:

R, $R^4$ and s are as defined hereinafore; and

X is an ester forming reactive group selected from halogen radicals, preferably chlorine and bromine, and the $-OR^{13}$ radicals wherein $R^{13}$ is selected from alkyl radicals, cycloalkyl radicals, aryl radicals, aralkyl radicals, and alkaryl radicals.

The preferred alkyl radicals represented by $R^{13}$ are those containing from 1 to about 10 carbon atoms. These include the straight chain alkyl radicals and the branched alkyl radicals. The preferred cycloalkyl radicals represented by $R^{13}$ are those containing from 4 to about 7 ring carbon atoms. The preferred aryl radicals represented by $R^{13}$ are those containing from 6 to 12 carbon atoms and include phenyl, biphenyl, and naphthyl. The preferred aralkyl and alkaryl radicals represented by $R^{13}$ are those containing from 7 to about 14 carbon atoms.

It is, of course, possible to utilize mixtures of two or more different aromatic hydroxy carboxylic acids or their ester forming reactive derivatives. Therefore, whenever the term aromatic hydroxy carboxylic acid or its ester forming reactive derivative is used herein it is to be understood that this term includes mixtures of two or more of these acids or their ester forming reactive derivatives as well as individual aromatic hydroxy carboxylic acids or their ester forming reactive derivatives.

The aromatic or aliphatic diol, of which $R^1$ in Formula I is a residue, and which is coreacted with the aromatic hydroxy carboxylic acid or its ester forming reactive derivative to produce the diester-diol reactant used in the preparation of the copolyester-carbonate resins of the instant invention may be represented by the general formula

HO—$R^1$—OH wherein $R^1$ is as defined hereinafore. The aliphatic diols may be represented by the general formula

HO—$R^{14}$—OH wherein $R^{14}$ is selected from alkylene, cycloalkylene, alkylidene, and cycloalkylidene radicals of the type described hereinafore. Preferably $R^{14}$ is an alkylene or cycloalkylene radical of the type described hereinafore.

The aliphatic ether diols may be represented by the general formula

HO—$R^5$—O)$_n$$R^6$—OH wherein $R^5$, $R^6$ and n are as described hereinafore.

The aromatic diols may be represented by the general formula

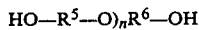

wherein $R^7$, q and Ar are as defined hereinafore.

Some illustrative non-limiting examples of aliphatic diols and aliphatic ether diols include:

HO—CH$_2$CH$_2$—OH;

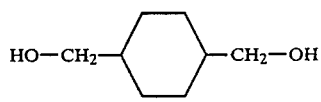

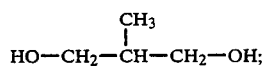

HO—CH$_2$(CH$_2$)$_8$CH$_2$—OH;

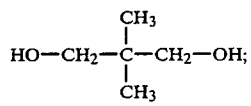

and

HO—CH$_2$CH$_2$—O—CH$_2$CH$_2$—OH.

Some illustrative non-limiting examples of aromatic diols include:

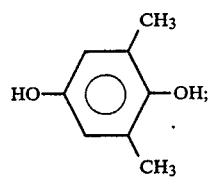

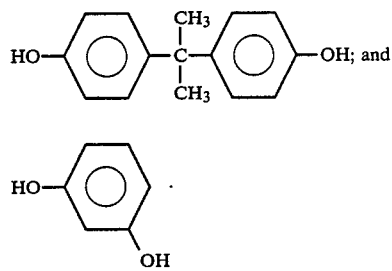

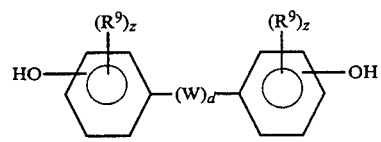

It is possible to utilize a mixture of two or more different diols as well as the individual diols. For example, it is possible to utilize two different aromatic diols, two or more different aliphatic diols, or at least one aliphatic diol and at least one aromatic diol.

The dihydric phenol reactant, of which $R^2$ in Formula III is the residue, may be represented by the general formula

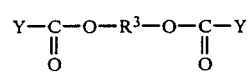

wherein $R^9$, W, z, and d are as defined hereinafore.

Some illustrative non-limiting examples of suitable dihydric phenols include:
2,2-bis(4-hydroxyphenyl)propane (bisphenol-A);
2,2-bis(3,5-dimethyl-4-hydroxyphenyl)propane;
2,2-bis(3-chloro-4-hydroxyphenyl)propane;
bis(4-hydroxyphenyl)methane;
1,1-bis(4-hydroxyphenyl)cyclohexane;
1,1-bis(4-hydroxyphenyl)ethane;
4,4'-thiodiphenol;
1,3-bis(4-hydroxyphenyl)propane;
3,3-bis(4-hydroxyphenyl)pentane;
2,2-bis(3-chloro-5-methyl-4-hydroxyphenyl)propane; and
2,2-bis(3,5-dibromo-4-hydroxyphenyl)propane.

The bishaloformate reactant, of which $R^3$ in Formula II is the residue, is represented by the general formula $$Y-\underset{\underset{O}{\|}}{C}-O-R^3-O-\underset{\underset{O}{\|}}{C}-Y$$

wherein $R^3$ is as defined hereinafore and Y is independently selected from halogen radicals, preferably chlorine.

Some illustrative non-limiting examples of these bishaloformates include:

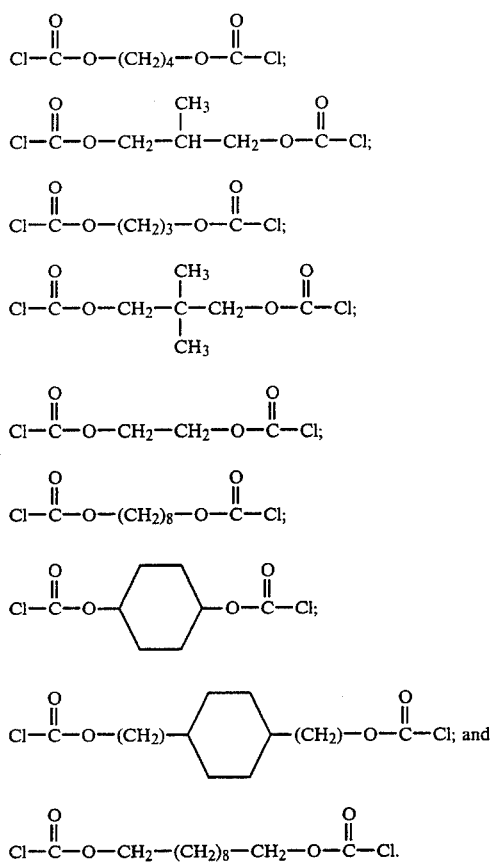

The carbonyl halide carbonate precursor is selected from carbonyl chloride, carbonyl bromide, and mixtures thereof. Carbonyl chloride, also known as phosgene, is the preferred carbonyl halide carbonate precursor.

In preparing the copolyester-carbonates of the instant invention the aromatic hydroxy carboxylic acid or its ester forming reactive derivative is first reacted with the diol to form a diester-diol. More particularly, two moles of the aromatic hydroxy carboxylic acid or its ester forming reactive derivative are reacted with one mole of the diol to form a diester-diol of the formula

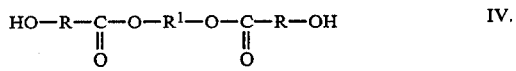

wherein R and $R^1$ are as defined hereinafore. More particularly, the diester-diols of Formula IV may be represented by the general formula

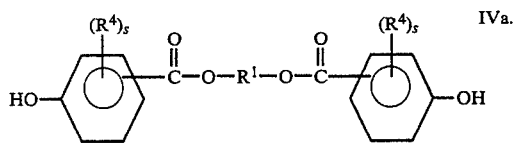

wherein $R^1$, $R^4$ and s are as defined hereinafore.

The reaction of the aromatic hydroxy carboxylic acid or its ester forming reactive derivative with the diol is carried out under substantially anhydrous conditions. If the aromatic hydroxy carboxylic acid itself or its ester derivative, i.e., where X is $-OR^{13}$, is utilized the reaction is carried out in the presence of an esterification-transesterification catalyst. Such catalysts are well known in the art and include the protic acids and the Lewis acids. Some useful Lewis acid catalysts are disclosed in U.S. Pat. No. 4,045,464, which is hereby incorporated by reference. If the acid halide is used, i.e., where X is a halogen radical, the reaction of the acid halide and the diol is preferably carried out in the presence of an acid acceptor. These acid acceptors are well known in the art and include the organic bases such as pyridine, triethylamine, and the like, and the inorganic bases such as sodium hydroxide, calcium hydroxide, and the like.

In order to avoid or keep to a minimum the formation of byproducts other than the diester-diol product of Formula IV during the reaction of the aromatic hydroxy carboxylic acid or its ester forming reactive derivative with the diol and the reaction conditions and/or the reactants may be selected such that the diester-diol of Formula IV is the predominant product. Thus, for example, if an aromatic diol such as bisphenol-A is utilized it may be reacted with a phenyl ester of the aromatic hydroxy carboxylic acid in the presence of a transesterification catalyst and the phenol byproduct may be removed by distillation. If an aliphatic diol is utilized the reaction of the acid with itself to form the ester of the aromatic hydroxy carboxylic acid is negligible as the predominant reaction product is that of the acid with the aliphatic diol, i.e., the diester-diol.

While theoretically 2 moles of the acid or its ester forming reactive derivative will react with one mole of the diol to form the diester-diol, in practice generally more than 2 moles of acid are utilized for every mole of the diol.

In order to produce the copolyester-carbonate resins of the instant invention the diester-diol of Formula IV, the dihydric phenol, the bishaloformate, and the carbonyl halide carbonate precursor are reacted under reaction conditions effective to form the copolyester-carbonate resins containing recurring structural units of Formulae I, II and III. Generally, the total molar amounts of the bishaloformate and the carbonyl halide used are at least equal to the total molar amounts of the diester-diol and the dihydric phenol present. Generally, the carbonyl halide may be present in an excess amount in order to secure complete reaction.

The copolyester-carbonates of the instant invention may be segment polymers or random polymers. In order to obtain mainly random polymers the bishaloformate and the carbonyl halide are added simultaneously to a mixture containing the diester-diol and the dihydric phenol.

In the formation of the segment polymers the sequence of addition and reaction of the various reactants will generally be determinative of the type of segments produced. Thus, in order to produce a copolyester-carbonate containing segments represented by the general formula

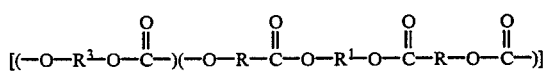

generally equimolar amounts of the diester-diol and the bishaloformate are first coreacted, and thereafter the dihydric phenol and the carbonyl halide are added to the coreaction product of the diester-diol and the bishaloformate.

In order to obtain a copolyester-carbonate containing segments represented by the general formula

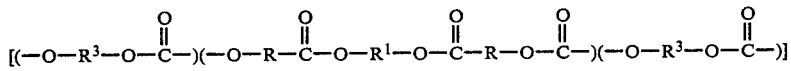

two moles of the bishaloformate are reacted with one mole of the diester-diol, and to this reaction product are added the dihydric phenol and the carbonyl halide carbonate precursor.

In order to yield copolyester-carbonates containing segments represented by the general formula

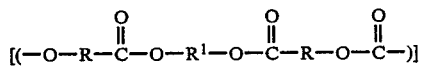

the diester-diol is first reacted with the carbonyl halide, and the resulting reaction product is then coreacted with the dihydric phenol and the bishaloformate.

In order to produce copolyester-carbonates containing segments represented by the general formula

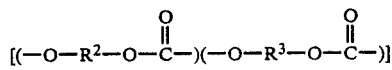

generally equimolar amounts of the bishaloformate and the dihydric phenol are reacted, and this reaction product is then reacted with the diester-diol and the carbonyl halide.

In order to produce copolyester-carbonates containing segments represented by the general formula

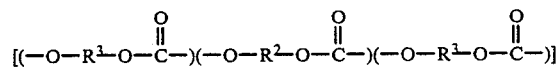

two moles of the bishaloformate are reacted with one mole of the dihydric phenol, and this reaction product is then reacted with the diester-diol and the carbonyl halide.

In order to form copolyester-carbonates containing segments of the type

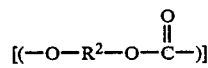

the dihydric phenol is first coreacted with the carbonyl halide and this coreaction product is then reacted with the diester-diol and the bishaloformate.

In order to obtain copolyester-carbonates containing segments represented by the general formula

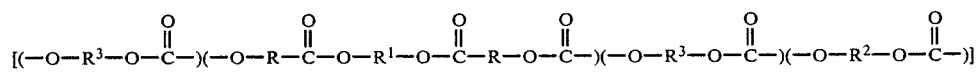

two moles of the bishaloformate are reacted with one mole of the diester-diol and one mole of the dihydric phenol, and to this reaction product is added the carbonyl halide.

In order to obtain copolyester-carbonates containing segments of the type

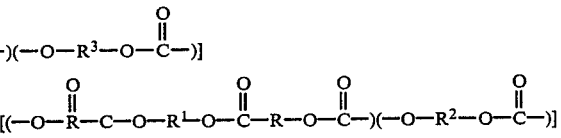

the carbonyl halide, the diester-diol, and the dihydric phenol are coreacted, and this reaction product is then reacted with the bishaloformate.

Generally, the amounts of the bishaloformate, diester-diol, and the dihydric phenol employed are amounts effective to produce copolyester-carbonate resins exhibiting improved processability while maintaining, to a substantial degree, substantially most of the other advantageous properties of conventional copolyester-carbonates. Generally, this amount of bishaloformates is in the range of from about 1 to about 40 mole percent, and preferably from about 2 to about 30 mole percent, based on the total amounts of bishaloformate, diester-diol and dihydric phenol employed. This amount of diester-diol is generally in the range of from about 1 to about 60 mole percent, and preferably from about 2 to about 50 mole percent, based on the total amounts of bishaloformate, diester-diol, and dihydric phenol employed. This amount of dihydric phenol is generally in the range of from about 20 to about 98 mole percent, and preferably from about 30 to about 90 mole percent, based on the total amounts of bishaloformate, diester-diol and dihydric phenol present.

The amounts of the recurring structural units of Formulae I, II and III present in the copolyester-carbonate resin will be dependant upon the various amounts of the diester-diol, bishaloformates and dihydric phenol utilized. Thus, for example, the larger the amount of diester-diol used the larger the amounts of recurring structural units of Formula I present in the copolyester-carbonate resin.

One method for preparing the copolyester-carbonates of the instant invention from the diester-diol, the dihydric phenol, the bishaloformate, and the carbonyl halide such as phosgene involves the heterogeneous interfacial polymerization technique. Such a interfacial polymerization technique is described in U.S. Pat. No. 3,169,121, which is hereby incorporated herein by reference. Generally in the interfacial polymerization technique two immiscible solvent systems are utilized for the reactants. One of these solvent systems is an aqueous solvent system and the other is a water immiscible organic solvent system such as methylene chloride. The addition of the phosgene and/or the bishaloformate is carried out under basic conditions by utilizing an aqueous caustic solution to maintain the pH in the basic range. Also present in the reaction mixture are a catalyst and a molecular weight regulator.

The catalysts which may be employed are any of the well known catalysts that accelerate or promote the copolyester-carbonate forming reaction. Suitable polymerization catalysts include, but are not limited to, tertiary amines such as triethylamine, quaternary ammonium compounds, and quaternary phosphonium compounds.

The molecular weight regulators employed may be any of the well known compounds that regulate the molecular weight of the copolyester-carbonates by a chain terminating mechanism. These compounds include phenol, tertiarybutyl phenol, Chroman-I, and the like.

The temperature at which the copolyester-carbonate forming reaction proceeds by the interfacial polymerization reaction may vary from below 0° C. to above 100° C. The reaction proceeds satisfactorily at temperatures from room temperature (25° C.) to about 50° C.

The instant copolyester-carbonates generally have a weight average molecular weight in the range of from about 10,000 to about 150,000, and preferably from about 15,000 to about 100,000.

The preferred copolyester-carbonates of the instant invention, from the standpoint of providing particularly improved processability, are those wherein $R^1$ is an aliphatic divalent radical or an aliphatic divalent ether radical.

The copolyester-carbonates of the instant invention may optionally have admixed therewith certain commonly known and used additives such as inert fillers such as glass, talc, mica, and clay; impact modifiers; ultraviolet radiation absorbers such as the benzophenones, benzotriazoles, and the cyanoacrylates; hydrolytic stabiliziers such as the epoxides disclosed in U.S. Pat. Nos. 3,489,716, 4,138,379 and 3,839,247, all of which are hereby incorporated by reference; color stabilizers such as the organophosphites; and flame retardants.

Some particularly useful flame retardants are the alkali and alkaline earth metal salts of sulfonic acids. These types of flame retardants are disclosed in U.S. Pat. Nos. 3,933,734, 3,948,851, 3,926,908, 3,919,167, 3,909,490, 3,953,396, 3,931,100, 3,978,025, 3,953,399, 3,917,599, 3,951,910 and 3,940,366, all of which are incorporated herein by reference.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percents are on a weight basis, unless otherwise indicated.

The following examples illustrate the preparation of the diester-diols of the instant invention.

EXAMPLE 1

This example illustrates the preparation of 1,10-decamethylene-bis(4-hydroxybenzoate).

A well stirred mixture of 76.1 grams (0.5 mole) of methyl p-hydroxybenzoate, 43.6 grams (0.25 mole) of 1,10-decanediol, and 0.3 gram of dibutyltin oxide is heated at 190°–200° C. for a period of about 5 hours in a reaction flask that is equipped with a distillation head and a reflux condenser permitting the methyl alcohol gradually liberated in the ester exchange reaction to be distilled at atmospheric pressure. When reflux of the alcohol ceases, water aspirator vacuum is applied and traces of the alcohol are stripped off, leaving behind as residue the diester-diol, which weighs 102.6 grams and represents a 99.0% yield. Recrystallization is effected by methanol/water, which yields white crystals with a melting point of 154°–155° C.

EXAMPLE 2

This examples illustrates the preparation of 1,4-tetramethylene-bis(4-hydroxybenzoate).

A well stirred mixture of 76.1 grams (0.5 mole) of methyl p-hydroxybenzoate, 22.5 grams (0.25) mole of 4,1-butanediol, and 0.51 gram of tetraoctyl titanate is heated at 170° C. for a period of about 8 hours in a reaction flask that is equipped with a distillation head and a reflux condenser permitting methanol, which is gradually liberated in the ester exchange reaction, to be distilled at atmospheric pressure. When reflux of the alcohol ceases, water aspirator vacuum is applied and the remaining traces of the alcohol are stripped off. Recrystallization is effected by methanol/water, which yields crystals having a melting point of 182.5°–184° C.

EXAMPLE 3

The procedure of Example 1 is substantially repeated except that the 43.6 grams of 1,10-decanediol are replaced with 0.25 mole of 2,2-dimethyl-1,3-propanediol. The resultant crystals of the diester-diol have a melting point of 156°–159° C.

EXAMPLE 4

The procedure of Example 1 is substantially repeated except that the 1,10-decanediol is replaced with 0.25 mole of 2-hydroxyethyl ether. The resultant crystals of the diester-diol have a melting point of 119°–121° C.

EXAMPLE 5

The procedure of Example 1 is substantially repeated except that the 1,10-decandiol is replaced with 0.25 mole of a cis/trans mixture of 1,4-cyclohexanedimethanol.

The following example illustrates the preparation of a conventional copolyester-carbonate resin falling outside the scope of the instant invention, and is presented for comparative purposes only.

EXAMPLE 6

To a reactor vessel fitted with a mechanical agitator are charged 10 liters of deionized water, 16 liters of methylene chloride, 1,910 grams (8.36 moles) of bisphenol-A, 24 milliliters of triethylamine, 3.4 grams of sodium gluconate, and 65 grams of para-tertiarybutyl phenol. This reaction mixture is stirred and to the stirred reaction mixture are added over a 15 minute period 926 grams of terephthaloyl dichloride and 163 grams of isophthaloyl dichloride as a 25 weight % solids solution in methylene chloride. During the acid chloride addition the pH is maintained in the range of 8.5–11.5 by the addition of 25% aqueous sodium hydroxide solution. The resulting mixture is phosgenated by the introduction of phosgene at the rate of 36 grams per minute for 15 minutes with the pH controlled at 9.5 to 12 by the addition of aqueous sodium hydroxide. After phosgenation is terminated, 6 liters of methylene chloride are added, the brine layer is separated by centrifuge and the resin solution is washed with aqueous acid and thrice with water. The resin is steam precipitated and dried in a nitrogen fluid bed drier at approximately 240° C.

The Kasha Index (KI) of this resin is determined and the results are set forth in Table I.

The Kasha Index (KI) is an indication or measure of the processability of the resin. The lower the KI the greater the melt flow rate and, therefore, the better the processability, of the resin. Basically, the Kasha Index is a measurement of the melt viscosity of the resin. The procedure for determining the Kasha Index is as follows: 7 grams of resins pellets, dried a minimum of 90 minutes at 125° C. are added to a modified Tinius-Olsen T3 melt indexer; the temperature in the indexer is maintained at 300° C. and the resin is heated at this temperature for 6 minutes; after 6 minutes the resin is forced through a 0.04125 inch radius orifice using a plunger of radius 0.1865 inch and an applied force of 17.7 pounds; the time required for the plunger to travel 2 inches is measured in centiseconds and this is reported as the KI. The higher the KI the higher the melt viscosity and the more viscous the resin, and, therefore, the more difficult to process.

The following example illustrates the preparation of a conventional polycarbonate resin falling outside the scope of the instant invention. This example is presented for comparative purposes only.

EXAMPLE 7

Into a mixture of 57.1 grams (0.25 mole) of bisphenol-A, 300 milliliters of water, 400 milliliters of methylene chloride, 0.6 gram phenol, and 0.56 gram of triethylamine are introduced, at ambient temperature, 31.0 grams of phosgene over a period of 31 minutes while maintaining the pH of the two phase system at about 11 by the simultaneous addition of a 25% aqueous sodium hydroxide solution. At the end of the phosgene addition period of the pH of the aqueous phase is 11.7 and the bisphenol-A content of this phase is less than 1 part per million as demonstrated by ultraviolet analysis.

The methylene chloride phase is separated from the aqueous phase, washed with an excess of dilute (0.01N) aqueous HCl and then washed three times with deionized water. The polymer is precipitated with methanol and dried at 80° C.

The KI of this polycarbonate resin is determined and the results are set forth in Table I.

The following example illustrates the preparation of a copolyester-carbonate resin of the instant invention.

EXAMPLE 8

Into a slurry of 54.2 grams (0.2375 mole) of bisphenol-A, 0.5 gram of phenol, 0.5 gram of triethylamine, 400 milliliters of methylene chloride, and 300 milliliters of water, there is added sufficient 25% sodium hydroxide aqueous solution to bring the pH to 10.5. A solution of 10.75 grams (0.05 mole) of 1,4-butanediol bischloroformate in 50 milliliters of methylene chloride is added dropwise to this reaction mixture over a period of 10 minutes while maintaining the pH between 10.5 and 11, followed by stirring for 5 minutes. 4.8 grams (0.0125 mole) of the diester-diol prepared in accordance with the procedure of Example 5 is then added, followed by phosgenation for 26 minutes at a rate of 1 gram of phosgene per minute while maintaining the pH near 11 by the addition of the aqueous sodium hydroxide solution. At the end of this period the reaction mixture contains 23 parts per million of bisphenol-A as determined by ultraviolet analysis.

The methylene chloride phase is separated from the aqueous phase, washed with an excess of dilute (0.01N) aqueous HCl and then washed three times with deionized water. The polymer is precipitated with methanol and dried.

The resultant polymer has an IV in methylene chloride at 25° C. of 0.606 dl/gm, and a second order glass transition temperature (Tg) of 122° C.

The KI of this copolyester-carbonate is determined and the results are set forth in Table I.

TABLE I

| Example No. | KI |
|---|---|
| 6 | 42,630 |
| 7 | 9,220 |
| 8 | 425 |

As illustrated by the data in Table I the copolyester-carbonates of the instant invention exhibit a lower KI than the conventional copolyester-carbonates. Furthermore, not only do the instant copolyester-carbonates exhibit a lower KI than conventional copolyester-carbonates, but they also exhibit a lower KI than conventional polycarbonates. Thus, not only do the instant copolyester-carbonates exhibit improved processability as compared with conventional copolyester-carbonates, but they also exhibit better processability than conventional polycarbonates. Since generally polycarbonates are easier to process than copolyester-carbonates, this improved processability vis-a-vis polycarbonates is unusual and unexpected.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. Thermoplastic copolyester-carbonates exhibiting improved processability comprised of recurring structural units represented by the general formulae

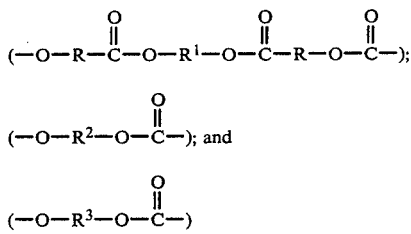

wherein:
R is independently selected from divalent aromatic radicals;
$R^1$ is selected from divalent aromatic radicals, divalent aliphatic radicals, and divalent aliphatic ether residues represented by the general formula

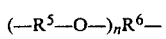

wherein $R^5$ is independently selected from alkylene radicals and cycloalkylene radicals, $R^6$ is selected from alkylene radicals and cycloalkylene radicals, and n is a positive integer having a value of from 1 to about 10;
$R^2$ is selected from divalent residues of dihydric phenols represented by the general formula

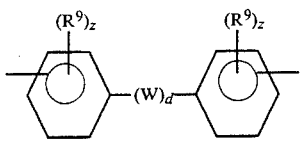

wherein $R^9$ is independently selected from monovalent hydrocarbon radicals and halogen radicals, z is independently selected from positive integers having a value of from 0 to 4 inclusive, d is either zero or one, and W is selected from divalent hydrocarbon radicals, —O—, —S—, —S—S—,

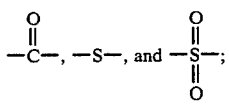

and $R^3$ is selected from divalent aliphatic radicals.

2. The copolyester-carbonates of claim 1 wherein R is selected from radicals represented by the general formula

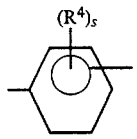

wherein:

$R^4$ is independently selected from monovalent hydrocarbon radicals and halogen radicals; and s is a positive integer having a value of from 0 to 4 inclusive.

3. The copolyester-carbonates of claim 2 wherein said halogen radicals are selected from chlorine and bromine.

4. The copolyester-carbonates of claim 2 wherein the monovalent hydrocarbon radicals are selected from alkyl radicals and cycloalkyl radicals.

5. The copolyester-carbonates of claim 2 wherein said divalent aliphatic radicals represented by $R^1$ are selected from alkylene radicals and cycloalkylene radicals.

6. The copolyester-carbonates of claim 2 wherein said divalent aromatic radicals represented by $R^1$ are selected from radicals represented by the general formula

wherein:

$R^7$ is independently selected from monovalent hydrocarbon radicals and halogen radicals;

Ar is selected from divalent aromatic radicals; and q is a positive integer having a value of from and including zero up to the number of positions on Ar available for substitution.

7. The copolyester-carbonates of claim 6 wherein said monovalent hydrocarbon radicals represented by $R^7$ are selected from alkyl radicals, cycloalkyl radicals, aryl radicals, aralkyl radicals, and alkaryl radicals.

8. The copolyester-carbonates of claim 6 wherein said divalent aromatic radicals represented by Ar are selected from phenylene, naphthylene and biphenylene.

9. The copolyester-carbonates of claim 8 wherein said divalent aromatic radical represented by Ar is the phenylene radical.

10. The copolyester-carbonates of claim 6 wherein Ar is selected from radicals represented by the general formula

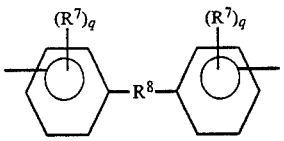

wherein $R^8$ is an alkylene radical, a cycloalkylene radical, an alkylidene radical, or a cycloalkylidene radical.

11. The copolyester-carbonates of claim 10 wherein q is zero and $R^8$ is the 2,2-propylidene radical.

12. The copolyester-carbonates of claim 2 wherein $R^1$ selected from divalent aliphatic radicals.

13. The copolyesters of claim 1 wherein the divalent hydrocarbon radicals represented by W are selected from alkylene radicals, cycloalkylene radicals, alkylidene radicals, and cycloalkylidene radicals.

14. The copolyester-carbonates of claim 13 wherein z is zero and W is the 2,2-propylidene radical.

15. The copolyesters of claim 2 wherein $R^3$ is selected from divalent hydrocarbon radicals.

16. The copolyester-carbonates of claim 15 wherein said divalent aliphatic hydrocarbon radicals are selected from alkylene radicals, cycloalkylene radicals, alkylidene radicals, and cycloalkylidene radicals.

17. The copolyester-carbonates of claim 15 wherein said divalent aliphatic hydrocarbon radicals are selected from alkylene radicals.

18. Thermoplastic copolyester-carbonates exhibiting improved processability which contain the reaction products of:

(i) at least one diester diol which is the reaction product of at least two moles of at least one aromatic hydroxy carboxylic acid or an ester forming reactive derivative thereof and one mole of at least one diol;

(ii) at least one dihydric phenol;

(iii) at least one bishaloformate; and (iv) a carbonyl halide carbonate precursor.

19. The copolyester-carbonates of claim 18 wherein said diester-diol is represented by the general formula

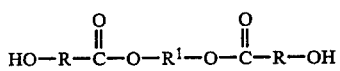

wherein:

R is independently selected from divalent aromatic radicals; and $R^1$ is selected from divalent aromatic radicals, divalent aliphatic radicals, and divalent aliphatic ether residues.

20. The copolyester-carbonates of claim 19 wherein said aromatic hydroxy carboxylic acid is represented by the general formula

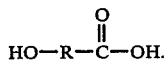

21. The copolyester-carbonates of claim 20 wherein said ester forming reactive derivative of said aromatic hydroxy carboxylic acid is represented by the general formula

wherein X is selected from halogen radicals and —$OR^{13}$ radicals where $R^{13}$ is a monovalent hydrocarbon radical.

22. The copolyester-carbonates of claim 19 wherein said diol is represented by the general formula

23. The copolyester-carbonates of claim 19 wherein said dihydric phenol is represented by the general formula

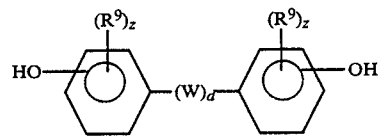

wherein:

$R^9$ is independently selected from monovalent hydrocarbon radicals and halogen radicals;

W is selected from divalent hydrocarbon radicals, —O—, —S—, —S—S—,

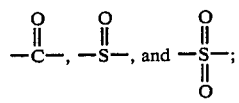

z is independently selected from positive integers having a value of from 0 to 4 inclusive;

and d is either zero or one.

24. The copolyester-carbonates of claim 23 wherein said monovalent hydrocarbon radicals represented by $R^9$ are selected from alkyl, cycloalkyl, aryl, aralkyl, and alkaryl radicals.

25. The copolyester-carbonates of claim 23 wherein said divalent hydrocarbon radicals represented by W are selected from alkylene, alkylidene, cycloalkylene, and cycloalkylidene radicals.

26. The copolyester-carbonates of claim 19 wherein said bishaloformate is represented by the general formula

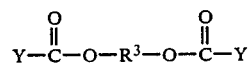

wherein:

Y is independently selected from halogen radicals; and $R^3$ is selected from divalent aliphatic radicals.

27. The copolyester-carbonates of claim 26 wherein said divalent aliphatic radicals represented by $R^3$ are selected from alkylene radicals and cycloalkylene radicals.

28. The copolyester-carbonates of claim 19 wherein said carbonyl halide is phosgene.

29. The copolyester-carbonates of claim 28 wherein said aromatic hydroxy carboxylic acid or its ester forming reactive derivative is hydroxy benzoic acid or an ester forming reactive derivative thereof.

30. The copolyester-carbonates of claim 29 wherein said diol is an aliphatic diol.

31. The copolyester-carbonates of claim 30 wherein said dihydric phenol is bisphenol-A.

32. The copolyester-carbonates of claim 31 wherein said bishaloformate is bischloroformate.

* * * * *

UNITED STATES PATENT AND TRADEMARK OFFICE
CERTIFICATE OF CORRECTION

PATENT NO. : 4,504,649
DATED : March 12, 1985
INVENTOR(S) : Victor Mark

It is certified that error appears in the above-identified patent and that said Letters Patent is hereby corrected as shown below:

Column 18, line 33, after the word "divalent", insert the word "aliphatic".

Signed and Sealed this

Twenty-third Day of February, 1988

*Attest:*

DONALD J. QUIGG

*Attesting Officer*      *Commissioner of Patents and Trademarks*